United States Patent Office 2,890,170
Patented June 9, 1959

2,890,170
ORGANOSILOXANE GREASES

William H. Ragborg, Midland, Mich., assignor to Dow Corning Corporation, Midland, Mich., a corporation of Michigan No Drawing. Application September 6, 1956
Serial No. 608,190

8 Claims. (Cl. 252—21)

The present invention relates to organosiloxane greases which provide an improved corrosion resistance in metals with which they are in contact.

A vast number of organosiloxane compositions of grease-like consistency have been described in the literature and are now well known articles of commerce. These greases have been used as lubricants, dielectric compounds, sealing compounds, and high vacuum greases, and for other similar uses where their high degree of heat stability, water repellency, resistance to change in consistency over a wide range of temperatures, and dielectrical properties have made them outstanding. In many such uses, however, these compositions have not been completely satisfactory because although the compositions themselves are inert and apparently do not cause corrosion of metal parts, they offer little or no protection against the natural tendency of such parts to corrode. This problem was particularly serious when the compositions were used in contact with copper or steel parts. The addition of the usual corrosion inhibitors did not solve this problem because they impaired the desirable properties of the grease.

It is an object of the present invention to provide improved organosiloxane compositions of grease-like consistency which retain all of the highly beneficial properties of the hitherto known organosiloxane greases and which have the additional beneficial property of providing corrosion resistance when applied to metals such as copper and steel.

It has been found that the addition of very small amounts of benzotriazole to the hitherto known organosiloxane grease compositions will provide the sought for corrosion resistance without impairing other desirable properties. Accordingly this invention specifically relates to a grease composition comprising a major proportion of an organopolysiloxane fluid, a grease thickening agent in an amount sufficient to thicken said fluid to the consistency of grease, and from 0.01 to 0.1 inclusive percent by weight of benzotriazole based on the weight of the organosiloxane. If desired, additional protection against the corrosion of steel can be provided by incorporating from 0.01 to 0.5 inclusive percent by weight of an anhydride of alkyl succinic, alkenyl succinic, alkyl glutaric, or alkenyl glutaric acids, or mixtures thereof, in which the alkyl and alkenyl radicals contain from 8 to 23 inclusive carbon atoms.

As has been noted above, a vast number of organopolysiloxane compositions of grease-like consistency are well known, and the addition of the defined amounts of benzotriazole (and if desired of the defined acid anhydrides) to any of these known compositions is within the scope of this invention.

The organopolysiloxane fluids employed herein are well known materials and any such fluids are applicable to this invention. In general the preferred fluids are those in which the organic groups attached to silicon are monovalent hydrocarbon radicals or halogenated monovalent hydrocarbon radicals. Examples of suitable radicals are the alkyl radicals such as methyl, ethyl and octadecyl, aryl radicals such as phenyl and xenyl, alkaryl radicals such as tolyl, aralkyl radicals such as benzyl, alkenyl radicals such as vinyl and allyl, cycloaliphatic radicals such as cyclohexyl and cyclohexenyl, haloaliphatic radicals such as chloromethyl, 1,1,1-trifluoropropyl and chlorovinyl, and haloaryl radicals such as mono- or dichlorophenyl, dibromophenyl, and hexachloroxenyl. As is known, the preferred radicals for maximum heat stability are methyl, ethyl and phenyl radicals. Halophenyl and haloxenyl radicals can be present (preferably at a maximum of about 25 mol percent) for maximum lubricity. Lower degrees of change in viscosity with change of temperature are provided when at least 50 mol percent of the organic radicals present in the organosiloxane are alkyl radicals, among which the methyl radicals are of course the most preferred.

The preferred organopolysiloxane fluids can be defined as having the average general formula

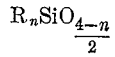

$$R_n SiO_{\frac{4-n}{2}}$$

where $n$ has an average value of from 1.9 to 3.0, with a preferred maximum value of 2.5. As will be obvious from the above description, the preferred R radicals are the monovalent hydrocarbon and halogenated monovalent hydrocarbon radicals. Although any organopolysiloxane fluid is applicable to the preparation of the greases, it is preferred that the fluid have a viscosity of from 50 cs. to 100,000 cs. at 25° C.

It is to be understood that the formula given above for the preferred fluids is inclusive of those fluids which contain any of the polymeric units $R_3SiO_{.5}$, $R_2SiO$, $RSiO_{1.5}$ and $SiO_2$ (the latter being used in this particular instance as a polymeric unit rather than as a formula for silica). However, these units should be present in a proportion such that the defined average value for $n$ is obtained in any copolymer employed. When the greases of this invention are to be used as dielectric compositions, or when extremely good lubricating properties are not particularly necessary, the most preferred fluids are the dimethylpolysiloxanes, particularly in their trimethylsiloxy end-blocked forms.

Any thickening agent capable of thickening the organopolysiloxane fluids to a grease-like or paste-like consistency can be employed herein, and a multitude of such agents are well known in the art. Examples of suitable agents include the metallic salts of fatty acids of at least 8 carbon atoms where the metals are, e.g., Al, Pb, Zn, or Mg, or alkali metals such as Li, Na, and K, or alkaline earth metals such as Ca, Ba, and Sr, and miscellaneous metals such as Cu, Mn, Hg, Bi, Cr, Fe, Co, and Ni, which are disclosed as thickeners in U.S. Patents 2,456,642 and 2,599,984. Metallic salts of alicyclic substituted fatty acids having a chain length of from 2 to 6 carbon atoms, as disclosed in U.S. Patent No. 2,551,931, are also highly suitable, along with the soaps of hydroxy fatty acids and hydroxy fatty acid glycerides as disclosed in U.S. Patent 2,508,741.

U.S. Patent No. 2,606,153 shows lithium 2-ethylhexoate, lithium hydroxystearate, lithium myristate and lithium caprate as productive of organosiloxane greases. Phthalocyanine is employed as a thickener in U.S. Patent No. 2,597,018 and U.S. Patent No. 2,486,674 describes the use of carbon black as a suitable agent. The finely divided inert metallic oxides are also excellent grease thickening agents, particularly in their aerogel form, such as the silicon dioxide, aluminum oxide, and iron oxide described in U.S. Patent No. 2,428,608, along with other inert finely divided oxides such as those of titanium and zinc. Silica in other forms, such as fume silica or natural deposits such as diatomaceous earth, is also an excellent thickening agent, as are such diverse agents as clay and calcium carbonate.

Other suitable grease thickening agents include the complex basic aluminum soaps such as aluminum benzoate stearate as described in U.S. Patent No. 2,599,553, acyl ureas such as octadecanoyl urea as described in U.S. Patent No. 2,698,300 and the phenylenediamides such as N,N-acetyl stearoyl-p-phenylenediamide as described in U.S. Patent No. 2,709,157.

The amounts of the grease thickening agents employed herein will of course vary with the particular type and viscosity of organosiloxane fluids employed and with the particular agent which is chosen. The amount employed is that which is sufficient to thicken the fluid to the consistency of a grease, and can of course vary within wide limits even within one particular system depending upon how "thick" a grease is desired. In any regard, the amount of any particular agent necessary to provide the desired type of grease is readily determined by the simplest sort of experimentation.

This invention is inclusive of greases which are so "light" or "thin" in consistency that they actually exhibit flow at room temperature, such as greases which have a viscosity of about 20,000 cps. at 25° C. as determined with a Brookfield Synchro-Lectric viscosimeter. Preferably, however, the minimum viscosity is in the region of 50,000 to 100,000 cps. At the other extreme, the invention is inclusive of greases which are so thick that they approach the consistency and appearance of putty. The consistency of these heavier greases is ordinarily measured in terms of an ASTM "penetrometer" rating as determined by the ASTM Test Method D-217-52T. Preferably the greases herein are sufficiently "fluid" that they have an "unworked penetration" or "penetrometer" rating of at least 120 mm. as determined at 77° F., with a preferred maximum of about 330 mm.

As previously noted, the organopolysiloxane fluid constitutes a major proportion of the substituents of the greases of this invention, thus the fluids must represent not less than 50 percent by weight of the total composition. Accordingly the thickening agents are generally employed in amounts of from 3 to 49.99 inclusive percent by weight of the total composition. The best greases are obtained by the use of from 3 to 30 percent inclusive of those agents which have been specifically described herein. In the compositions whose primary use is that of a dielectric composition and which preferably employ finely divided silica as the thickening agent, the preferred amounts of said agent range from 3 to 15 inclusive percent by weight.

The benezotriazole which is employed herein is a well known article of commerce, and has the formula

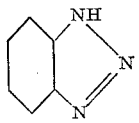

Although any amount from 0.01 to 0.1 percent by weight based upon the weight of the organosiloxane can be used, the preferred amount for economy and performance is in the region of 0.02 to 0.06 percent.

The anhydrides of alkyl succinic, alkenyl succinic, alkyl glutaric, and alkenyl glutaric acids are optionally employed in the greases of this invention to improve their ability to impart corrosion resistance when used in contact with ferrous metals such as steel. When such anhydrides are used they are preferably employed in an amount of from 0.01 to 0.5 percent by weight based upon the weight of the organopolysiloxane.

The alkyl and alkenyl radicals in the defined anhydride can contain from 8 to 23 inclusive carbon atoms, and can be either a normal or branched-chain group. The position of the double bond in the alkenyl groups is immaterial, as is the position of either group on the cyclic anhydride molecule. These materials can be represented by the formulas:

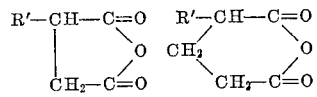

and

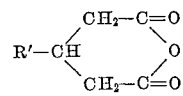

where R' is the defined alkyl or alkenyl radical, e.g., octyl, octenyl, 2-ethylhexyl, dodecenyl, octadecyl, octadecenyl, and tricosenyl radicals. Mixtures of the anhydrides can be used if desired, and in the case of the glutaric anhydrides such mixtures are often employed.

Other additives can be present in the composition of this invention if desired. The incorporation of e.g. pigments, antioxidants, and additives for improving the lubricity or stability of the greases is within the scope of this invention. The addition of a host of such materials to organosiloxane greases is amply described in the literature.

The compositions of this invention can be prepared by merely mixing the defined constituents in any suitable mixing equipment, and the order of addition of the constituents is not important. The use of a roll mill has been found to be eminently suitable to provide thoroughly mixed homogeneous mixtures.

Although the compositions of this invention have been generally described as "greases," it is to be understood that this term is used in the broad sense and refers to the consistency and appearance of the compositions rather than to a use which is necessarily in the field of lubrication. Thus the term includes materials which are conventionally referred to as greases in the lubrication sense, and materials which are known broadly as "compounds," e.g., sealing compounds, dielectric compounds etc.

The compositions of this invention are useful as lubricants, damping media, and as dielectric and sealing compounds in ignition systems and electronic equipment. One particularly vexing problem which has been solved by the use of these compositions is the corrosion problem which hitherto existed in the splicing of copper wire. In this particular use, the junction has been protected heretofore by inserting it into a sleeve (e.g. of polyethylene) which was filled with a silicone grease. Prior to this invention the area of splicing became undesirably corroded in spite of the protection of the silicone grease filled sleeve. When the comparable silicone grease of this invention was employed as the filler and insulating material, however, the corrosion problem was completely eliminated.

The following examples are illustrative only. All parts and percentages are by weight unless otherwise specified.

*Example 1*

A mixture of 250 parts of a trimethylsiloxy endblocked dimethylpolysiloxane having a viscosity of 800 cs. at 25° C., 29 parts of the silica marketed as "Santocel" and 0.1 part of benzotriazole was thoroughly mixed on a 3 roll mill. This resulted in a homogeneous grease which is hereafter designated as "grease A." For purposes of comparison, another grease was prepared using the same proportions and ingredients but omitting the benzotriazole, the latter grease being designated "grease B" hereinafter. It was found that grease A was comparable to grease B in regard to its heat stability, water repellency, resistance to change in consistency over a wide range of temperatures, dielectrical properties, and resistance to separation of components during exposure to high temperatures. In order to test the relative degree of protection afforded to copper against corrosion, strips of carefully cleaned copper foil were coated with a thin film of either grease A or grease B. These coated strips, along with a control strip which was tested without any coating thereon, were placed in separate containers of distilled water maintained at 70° C., and the appearance of the strips was inspected daily. At the end of 6 days the control strip had corroded very badly and was black in color, and the strips which had been coated with grease B showed considerable corrosion with the development of a green coating thereon. The strips which had been coated with grease A showed absolutely no signs of any corrosion whatsoever at the end of a 4 week test period.

*Example 2*

Greases were prepared in accordance with the formulation of grease A in Example 1, except that one of the following organosiloxane fluids was employed in the place of the dimethylpolysiloxane:

C. A copolymer of 5 mol percent monomethylsiloxane, 5 mol percent trimethylsiloxane, and 90 mol percent dimethylsiloxane units, having a viscosity of 500 cs. at 25° C.

D. A copolymer of 10 mol percent trimethylsiloxane, 40 mol percent dimethylsiloxane, and 50 mol percent phenylmethylsiloxane units, having a viscosity of 75 cs. at 25° C.

E. A copolymer of 3 mol percent trimethylsiloxane, 87 mol percent dimethylsiloxane, and 10 mol percent $Cl_2C_6H_3(CH_3)SiO$ units, having a viscosity of 1000 cs. at 25° C.

F. A copolymer of 10 mol percent dimethylphenylsiloxane, 85 mol percent ethylmethylsiloxane, and 5 mol percent vinylmethylsiloxane units, having a viscosity of about 100 cs. at 25° C.

G. A trimethylsiloxy end-blocked dimethylpolysiloxane having a viscosity of 12,500 cs. at 25° C.

H. A copolymer of 5 mol percent trimethylsiloxane, 85 mol percent dimethylsiloxane, and 10 mol percent $F_3CCH_2CH_2(CH_3)SiO$ units having a viscosity of 150 cs. at 25° C.

The greases so prepared provided improved corrosion resistance to copper which was coated therewith as compared to similar greases from which benzotriazole had been omitted.

*Example 3*

To 100 parts of "grease A" of Example 1 there was added 0.04 part of either dodecenyl succinic anhydride, n-octyl succinic anhydride, octenyl glutaric anhydride or octadecenyl glutaric anhydride. Each mixture was thoroughly milled and its physical properties tested. Each mixture was comparable to "grease B" in physical properties but when applied to strips of steel each mixture provided superior corrosion resistance as compared to "grease B."

*Example 4*

Greases were prepared by milling 100 parts of dimethylpolysiloxane fluid having a viscosity of 200 cs. at 25° C. with one of the following thickening agents in the indicated amounts: 10 parts carbon black, 15 parts lithium stearate, 20 parts lithium 12-hydroxystearate, 20 parts barium cyclohexylcaproate, 35 parts copper phthalocyanine, 40 parts lithium 2-ethylhexoate. When 0.05 percent by weight of benzotriazole based on the weight of the siloxane is added to these greases, each imparts an improved corrosion resistance when applied to copper.

That which is claimed is:

1. A grease composition consisting essentially of a major proportion of an organosiloxane fluid, a grease thickening agent in an amount sufficient to thicken said fluid to the consistency of a grease, and from 0.01 to 0.1 inclusive percent by weight of benzotriazole based on the weight of the organosiloxane.

2. A grease composition in accordance with claim 1 which contains from 0.01 to 0.5 inclusive percent by weight based on the weight of the organosiloxane of an acid anhydride selected from the group consisting of alkyl succinic, alkenyl succinic, alkyl glutaric, and alkenyl glutaric anhydrides and mixtures thereof, the alkyl and alkenyl radicals in said anhydride containing from 8 to 23 inclusive carbon atoms.

3. A grease composition consisting essentially of a major proportion of an organopolysiloxane fluid in which the organic groups attached to silicon are selected from the group consisting of monovalent hydrocarbon radicals and halogenated monovalent hydrocarbon radicals with at least 50 mol percent of said radicals being alkyl, from 3 to 49.99 inclusive percent by weight of a grease thickening agent based upon the total weight of the composition, and from 0.01 to 0.1 inclusive percent by weight of benzothiazole based upon the weight of the organopolysiloxane.

4. A grease composition in accordance with claim 3 which contains from 0.01 to 0.5 inclusive percent by weight based on the weight of the organopolysiloxane of an acid anhydride selected from the group consisting of alkyl succinic, alkenyl succinic, alkyl glutaric, and alkenyl glutaric anhydrides and mixtures thereof, the alkyl and alkenyl radicals in said anhydride containing from 8 to 23 inclusive carbon atoms.

5. A grease composition consisting essentially of a major proportion of an organopolysiloxane fluid having the average general formula $$R_nSiO_{\frac{4-n}{2}}$$

where R represents a radical selected from the group consisting of monovalent hydrocarbon and hologenated monovalent hydrocarbon radicals and $n$ has an average value of from 1.9 to 3.0 inclusive, from 3 to 30 inclusive percent by weight based upon the weight of the total composition of a grease thickening agent selected from the group consisting of (1) a finely divided metallic oxide selected from the group consisting of oxides of silicon, aluminum, titanium, zinc, and iron, (2) metal salts of fatty acids of at least 8 carbon atoms, (3) carbon black, and (4) phthalocyanine; and from 0.01 to 0.1 inclusive percent by weight of benzotriazole based upon the weight of the organopolysiloxane.

6. A grease composition in accordance with claim 5 which contains from 0.01 to 0.5 inclusive percent by weight based on the weight of the organopolysiloxane of an acid anhydride selected from the group consisting of alkyl succinic, alkenyl succinic, alkyl glutaric, and alkenyl glutaric anhydrides and mixtures thereof, the alkyl and alkenyl radicals in said anhydride containing from 8 to 23 inclusive carbon atoms.

7. A dielectric composition of grease-like consistency consisting essentially of a major proportion of a dimethylpolysiloxane fluid having a viscosity of from 50 cs. to 100,000 cs. at 25° C., from 3 to 15 inclusive percent by weight based upon the total weight of the composition of finely divided silica, and from 0.01 to 0.1 inclusive percent by weight of benzotriazole based upon the weight of the dimethylpolysiloxane.

8. A dielectric composition in accordance with claim 7 which contains from 0.01 to 0.5 inclusive percent by weight based on the weight of the dimethylpolysiloxane of an acid anhydride selected from the group consisting of alkyl succinic, alkenyl succinic, alkyl glutaric, and alkenyl glutaric anhydrides and mixtures thereof, the alkyl and alkenyl radicals in said anhydride containing from 8 to 23 inclusive carbon atoms.

References Cited in the file of this patent

UNITED STATES PATENTS

| | | |
|---|---|---|
| 2,160,293 | Shoemaker et al. | May 30, 1939 |
| 2,459,717 | Perry | Jan. 18, 1949 |
| 2,469,378 | Flett | May 10, 1949 |
| 2,597,018 | Merker et al. | May 20, 1952 |
| 2,618,606 | Schaeffer et al. | Nov. 18, 1952 |
| 2,618,608 | Schaeffer et al. | Nov. 18, 1952 |
| 2,647,872 | Peterson | Aug. 4, 1953 |
| 2,805,994 | Liehe et al. | Sept. 10, 1957 |